Dec. 11, 1951 — W. T. MARCHMENT — 2,578,257
MOVEMENT TRANSMITTING SYSTEM
Filed Nov. 7, 1949 — 2 SHEETS—SHEET 1

Inventor
William T. Marchment
By Ralph B. Stewart
Attorney

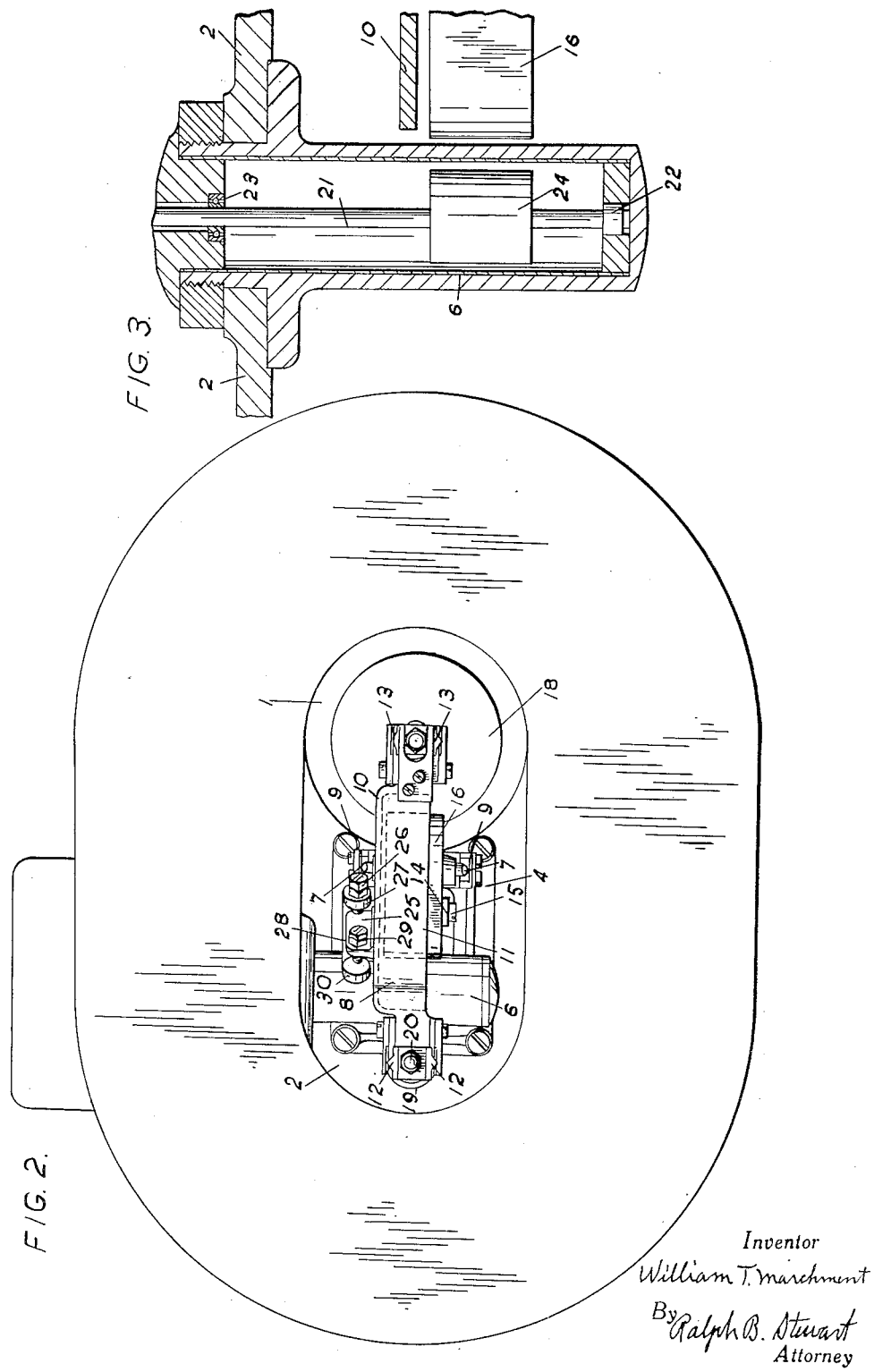

Patented Dec. 11, 1951

2,578,257

UNITED STATES PATENT OFFICE 2,578,257

MOVEMENT TRANSMITTING SYSTEM

William Thomas Marchment, Chiswick, London, England, assignor to Evershed & Vignoles Limited, London, England, a British company Application November 7, 1949, Serial No. 125,992
In Great Britain June 21, 1948

4 Claims. (Cl. 172—284)

1

This invention relates to apparatus for transmitting the movement of a member to another member, and particularly to apparatus in which a second member carries a magnet which is moved by the influence of a magnet carried by the first member.

A small magnet placed at a point within the field of a magnetic system will tend to set so that its magnetic axis lies in the direction of the lines of magnetic force at that point. In general these lines of force are curved. Therefore in general, relative movement between the small "following" magnet and the magnetic system will result in a change in the direction of the magnetic field in the neighbourhood of the magnet, which will consequently rotate, if it is free to do so, till it is once again aligned with the direction of the lines of magnetic force. One of the objects of the present invention is to arrange the following magnet within the field of a magnetic system at a point where a small translational or rotational and translational movement of the system relative to the magnet results in a considerable change in the direction of the magnetic field in the neighbourhood of the magnet, so producing a large angular movement of the magnet; in other words, at a point where the lines of force are sharply curved. Since the magnetic elements forming the magnetic system, and the small magnet, are not connected mechanically in any way, it is possible for the magnetic system to be situated on one side of the wall of a chamber, while the following magnet is situated on the other side, the sole connection between the two being the magnetic field which penetrates the walls of the chamber, provided the latter are of non-magnetic material. It is therefore possible to transmit small movements through the walls of a chamber without mechanical connection through these walls, the movements of the original member causing movements of greater amplitude in the following member which can be used to operate controls or indicators or for similar purposes.

According to the invention, in an apparatus for transmitting movements, a member, the movement of which is to be transmitted, carries a magnet which exerts a magnetic force on a second magnet, which may drive other apparatus, and which is pivotally mounted in such relation to the first magnet that small movements of the member carrying the first magnet result in comparatively large angular movements of the second magnet.

The two magnetically linked members may be

2 situated on either side of a wall of non-magnetic material which may form part of the wall of a vessel containing, for instance, fluids under pressure. Motion is then freely transmitted through the walls without mechanical penetration, thus obviating piercing the wall and the use of glands and stuffing boxes.

A particular example of this application is the indication of the level of a liquid in a closed vessel, the first magnet being actuated by a float on the surface of the liquid, and the second magnet being pivoted in a sleeve of non-magnetic stainless steel which projects into the vessel and communicates with the outside of the vessel so that the following magnet may drive an indicating instrument. One form which such an apparatus may take will now be described, as an example, with reference to the accompanying diagrams, in which:

Figure 2 is a view of the apparatus as seen from above; and

Figure 3 is a section of part of the apparatus on the line III—III in Figure 1.

Figure 1:
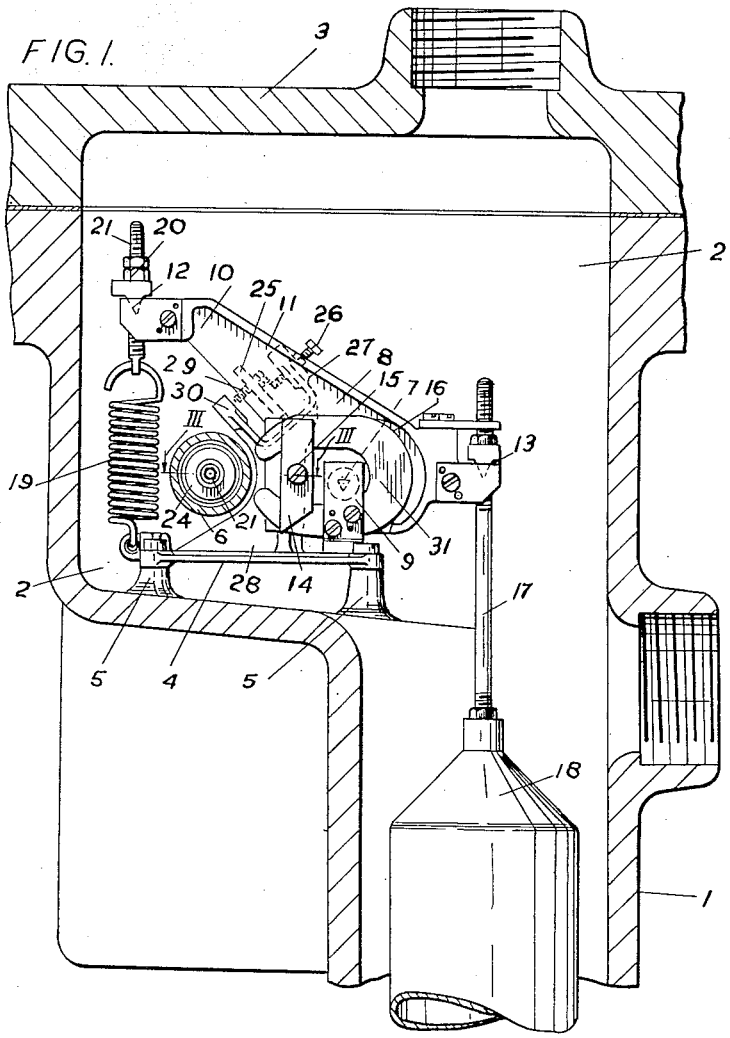
Figure 1 is a side elevation of the apparatus shown in an enclosing casing.

The liquid, the level of which is to be measured, is contained in a cylindrical vessel 1 which opens at its upper end into an oval chamber 2 which is closed by the cap 3. A base plate 4 which carries the instrument is supported on bosses 5, 5, in the chamber. This base plate has two pillars 9, 9, which support knife edges 7, 7, attached to the main beam 8. This beam consists of a web 10 and flange 11 and has one arm extending forward and upward to the point of support of the knife edges 12, and another arm extending backwards to the point of support for the knife edges 13. Attached to the web by a clamping plate 14 and screw 15 is a horseshoe magnet 16 arranged so that it lies in a vertical plane with its poles pointing away from the knife edges 13, while the axis of the knife edges 7 passes through the horseshoe magnet between the plate 14 and the yoke 31 of the magnet. From the knife edges 13, a rod 17 hangs down to support a float 18 which floats on the surface of the liquid in the vessel 1. The knife edges 12 at the other end of the beam support the nuts 20 on the screwed rod 21 to which is attached the upper end of the spring 19. The lower end of this spring is connected to the base plate 4.

Projecting horizontally from the side of the chamber 2 is a non-magnetic stainless steel sleeve 6 situated so that it is just clear of the poles of the magnet 16 and so that its axis is substantially equidistant from these poles when the beam 8 is in its mean or normal position. This sleeve does not communicate with the interior of the chamber 2 but its open end projects through the wall of the chamber 2 and communicates with the outside. A spindle 21 journalled in bearings 22, 23 is situated on the axis of the sleeve and carries a cylindrical magnet 24 immediately opposite the poles of the horseshoe magnet 16. This magnet 24 is magnetised along a diameter so that it is, in effect, a bar magnet free to turn in the plane of the horseshoe magnet. The spindle 21 projects through the casing 2 and can be used outside the apparatus, for instance, to drive a pointer over a suitably calibrated scale.

The position of the bar magnet 24 is such that the lines of force of the horseshoe magnet 16 are sharply curved in the neighbourhood of the bar magnet. In operation, a slight rise in level in the vessel 1 raises the float 18 and rod 17 so that the spring 19 can turn the beam 8, carrying the magnet 16, slightly, in an anticlockwise sense as seen in Figure 1. Due to the sharp curvature of the field of the magnet 16, the lines of force of the magnet 16 in the neighbourhood of the magnet 24 will now run in a direction very different from their former direction, the angular difference being considerably greater than the angle turned through by the beam. The bar magnet 24 will move to set along the new direction of the lines of force, turning through substantially the same angle as the change in direction of the lines of force at that point, and this angle will be indicated by an indicator driven by the spindle 21.

From the foregoing it will be seen that magnet 16 is mounted so that its poles are normally positioned on opposite sides of the plane passing through the pivoted axes of the two magnets, and the axis of the two poles of magnet 16 normally is at right angles to this plane.

The movement of the beam 8 can be limited by means of stops, one of which is carried by the web 10 of the beam on the opposite face to the magnet, at 25. An adjustable screw stop 26 is carried by a stationary arm 27 mounted on a standard 28 projecting upwards from the base plate 4, and this screw stop 26 in conjunction with the stop 25 on the beam, limits the clockwise rotation of the beam. The stop 25 itself carries an adjustable screw 29 which co-operates with a second arm 30 of the standard to limit the anticlockwise rotation of the beam 8.

I claim:

1. Apparatus for transmitting movements comprising, in combination, a driven magnet having a pair of spaced poles, means mounting said magnet for pivotal movement about an axis located substantially midway between its poles and arranged at right angles to its polar axis, said poles having an angular displacement of substantially 180° about said axis, a driving magnet having a pair of spaced poles, means mounting said driving magnet for pivotal movement about an axis parallel with and spaced from the pivotal axis of said driven magnet, said driving magnet being mounted with its poles located adjacent said driven magnet, equidistant from its pivotal axis and normally positioned on opposite sides of the plane in which both of said axes are located, the poles of said driving magnet being relatively closely spaced with respect to the radial distance of the driving magnet poles from their pivotal axis to produce a region of sharply curved field adjacent said poles, said driven magnet being positioned within said sharply curved region of the field of said driving magnet, whereby slight movements of said driving magnet in opposite directions from its normal position causes amplified angular movements of said driven magnet in opposite directions.

2. Apparatus according to claim 1, wherein said driving magnet comprises a horseshoe magnet having its poles arranged closely adjacent said driven magnet and its yoke extending around its pivotal axis.

3. Apparatus according to claim 2, wherein said driven magnet comprises a cylindrical magnet mounted for pivotal movement about its axis and having poles located at diametrically opposite points.

4. Apparatus according to claim 3 and including a vessel having a non-magnetic sleeve projecting into said vessel from one wall thereof and having its inner end closed and its outer end communicating with the outside of said vessel, said cylindrical magnet being mounted within said sleeve with its pivotal axis arranged coaxially with the axis of said sleeve, and said driving magnet being positioned within said vessel and having its poles arranged to move closely adjacent the wall of the non-magnetic sleeve.

WILLIAM THOMAS MARCHMENT.

REFERENCES CITED

The following references are of record in the file of this patent:

UNITED STATES PATENTS

| Number | Name | Date |
|---|---|---|
| 50,581 | Henis | Oct. 24, 1865 |
| 75,313 | Stein | Mar. 10, 1868 |
| 2,091,841 | Warren | Aug. 31, 1937 |
| 2,243,555 | Faus | May 27, 1941 |
| 2,371,511 | Faus | Mar. 13, 1945 |
| 2,467,073 | Binford | Apr. 12, 1949 |
| 2,509,644 | Kinderman | May 30, 1950 |